United States Patent Office 3,756,957
Patented Sept. 4, 1973

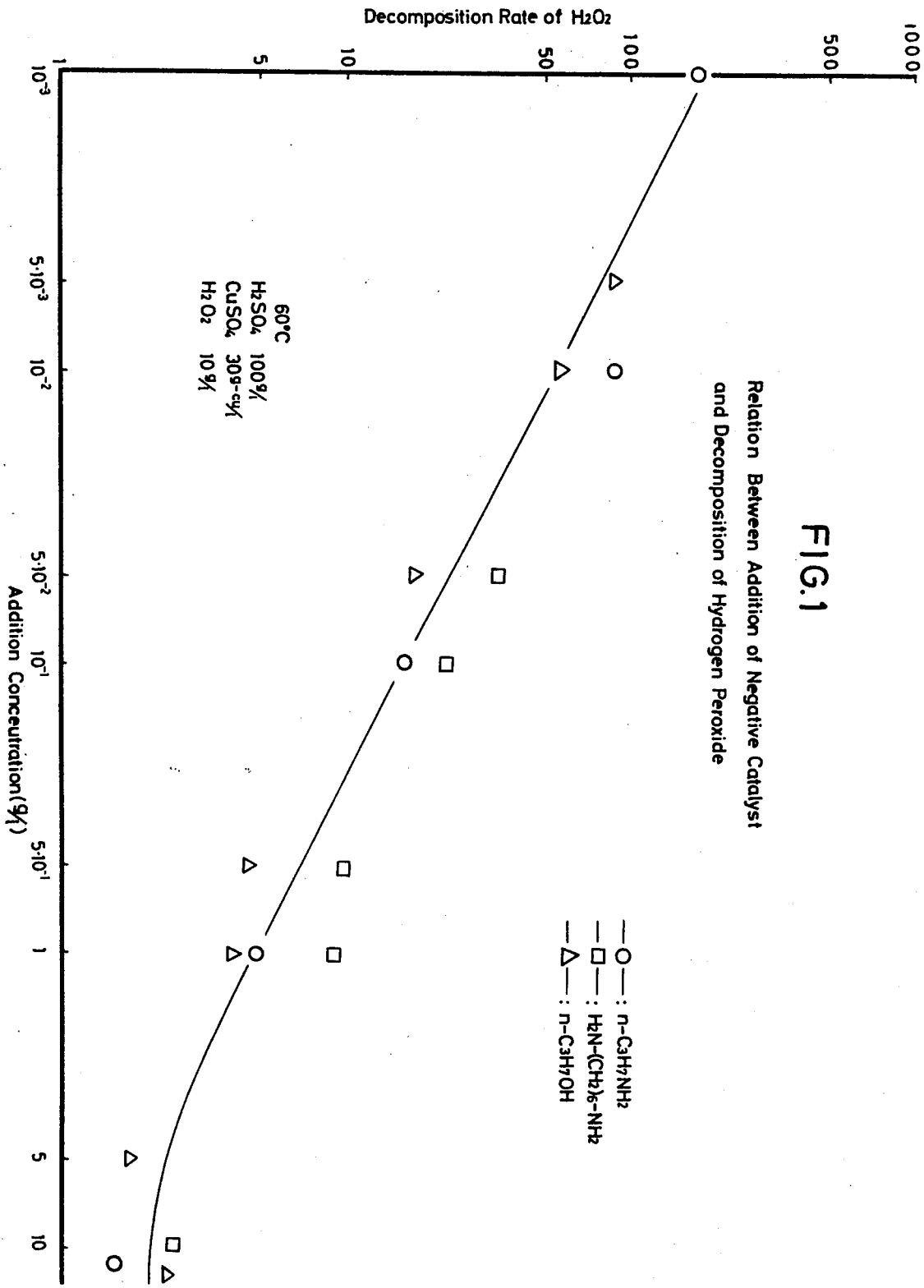

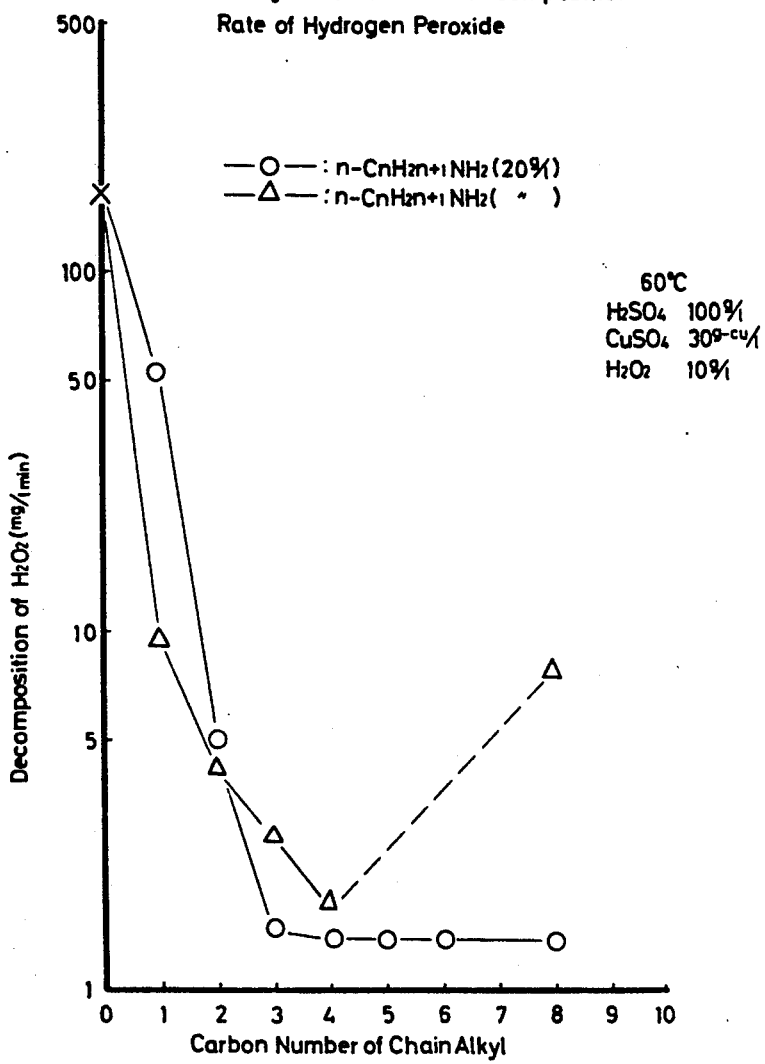

3,756,957
SOLUTIONS FOR CHEMICAL DISSOLUTION TREATMENT OF METALLIC MATERIALS
Shoji Shiga, Nikko, Japan, assignor to The Furukawa Electric Co., Ltd., Tokyo, Japan
Filed Mar. 15, 1971, Ser. No. 124,035
Int. Cl. H05k 1/00
U.S. Cl. 252—79.4    8 Claims

ABSTRACT OF THE DISCLOSURE

Solutions for the chemical dissolution treatment of metallic materials comprising an aqueous solution of sulphuric acid, hydrogen peroxide and at least one organic compound selected from the group consisting of aliphatic amines and their salts, alkoxy amines, aliphatic acid amides and alicyclic imines, said organic compound being present in an amount of more than 0.001 g./l.

---

The present invention relates to solutions useful for the chemical dissolution treatment (hereinafter called "the chemical treatment") of metallic materials. More particularly, this invention relates to the solutions which are prepared by adding to an aqueous solution of hydrogen peroxide and sulfuric acid, special organic substances as negative catalyst to suppress the decomposition reaction of hydrogen peroxide.

In the metal processing industry, a chemical treatment is widely employed, in which metals and metal compounds on the surface thereof are chemically removed by dissolution.

For example, aqueous solutions of mineral acids such as sulfuric, phosphoric and hydrochloric acids have been amply used for pickling to chemically dissolve oxide scale on the surface of the metal which oxide scale is formed during the hot working or heat treatment of the metal. However, in the case wherein the said oxide scale is slightly soluble or insoluble in the mineral acids, for example, an oxide such as cuprous oxide, or where the surface layer has many defects, such as a marred surface or an oxide-incorporated surface produced in the hot working procedure or where a dealloyed layer produced in the heat treatment of alloys is to be removed, a mixed solution containing an oxidizing agent such as a dichromate and a mineral acid has been widely employed.

Further, in etching or chemical milling by which an unnecessary part of the metallic phase is removed by dissolution, solutions containing various mineral acids and oxidizing agents such as nitric acid, a dichromate or an anhydrous chromic acid have been exclusively used.

Furthermore, in chemical polishing concentrated mixed solutions of various mineral acids and oxidizing agents have been used.

As has been mentioned above, in the chemical treatment of metals, oxidizing agents such as nitric acid, a dichromate, a chromate and anhydrous chromic acid have been used to accelerate dissolution of metals, but the ionization tendency of the compounds is smaller than or close to that of hydrogen.

In addition to the above functional defects, however, these treatments have now proved to involve other drawbacks because regulations concerning environmental pollution have become strict and because the price of metals has risen due to natural resource drainage.

For example, when oxidizing agents containing fatally poisonous hexavalent chromium such as a dichromate, a chromate and anhydrous chromic acid are used, the concentration of chromium is restricted to be in the order of 1/10 p.p.m. in the exhaust water from the plant and, therefore, tremendous planning, equipments and cost are needed to remove harmful substances in the used treatment solution and washing water. On the other hand, nitric acid, when used, produces poisonous nitrogen dioxide in a large quantity which deteriorates the working environment. In recent years the necessity of regulating nitrate ions in the service water has been pointed out, so that nitric acid involves the same difficult problems as that of chromic acid.

Furthermore, the recovery of the dissolved metal in the above treatment necessarily requires a very complicated process of recovery because a relatively large amount of oxidizing agent and its reduction product are present in the solution.

The present invention provides a process in which hydrogen peroxide is used as an oxidizing agent so as to eliminate the drawbacks of conventional methods. More particularly, this invention provides chemical treatment solutions to treat metallic materials composed of hydrogen peroxide, sulfuric acid, and a small amount of a negative catalyzing substance, such as an aliphatic amine or salts thereof, alkoxyamides, and acid amides, in order to permit hydrogen peroxide to be used in a stable way.

In the following sections, the various compositions and functions of the solutions used in the present invention as well as the processes used for chemical treatment will be described.

An aqueous solution containing 10 to 500 g./l. of sulfuric acid is, in many cases, not of practical use, because it cannot dissolve metals of smaller ionization tendency than hydrogen and metals of larger ionization tendency are dissolved in the solution only at a slow rate. Further, the said solution does not completely dissolve cuprous oxide, one of the oxides of copper which is shown as follows:

$$Cu_2O+2H^+ \rightarrow Cu^{++}+Cu+H_2O$$

In the present invention, however, hydrogen peroxide, in a concentration larger than 0.1 g./l., exhibits a strong oxidizing power; thus, a metal of smaller ionization tendency hydrogen, such as copper, is dissolved quickly, and metallic compounds insoluble in sulfuric acid such as some metal oxides can be made soluble as follows:

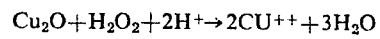
$$Cu_2O+H_2O_2+2H^+ \rightarrow 2CU^{++}+3H_2O$$

Processes for chemical treatment of metals in which an oxidizing agent is used has been practically employed, using as oxidizing agents hexavalent chromium compounds such as a dichromate and nitric acid, but they have encountered serious problems especially in regard to the prevention of environmental pollution and also in the recovery of the metal.

On the contrary, hydrogen peroxide is a powerful oxidizing agent and is not harmful, as is evident from the fact that it is widely used as sterilizer or an additive for foods, and also the reduction product thereof is water. Therefore, when hydrogen peroxide is used for the chemical treatment of metals, the processes involved are considerably simplified, since the removal of harmful substances in the used treatment solution and washing water as well as the removal of contaminants involved in the recovery of the metal are practically obviated. The advantage of this process is evident from the fact that in reducing the concentration of hexavalent chromium to the order of 1/10 p.p.m. in a large quantity of water, much equipment is required and that when expensive copper is recovered by neutralization or electrolysis, not only hexavalent but also trivalent chromium, formed by reduction, seriously interfere with the recovery.

As mentioned above, hydrogen peroxide is a well-known and abundantly produced oxidizing agent, but is a very unstable. Especially, in preparation, storage, transportation, and application of hydrogen peroxide, the entry of heavy metal ions must be avoided because they act as catalysts and accelerate the decomposition of hydrogen peroxide. On the other hand, however, dissolved metal ions inevitably present in the chemical treatment, therefore it was practically impossible to use hydrogen peroxide on a large scale.

The catalytic action of various metal ions, each used in a concentration of 0.5 g.-ion/l., in an aqueous solution at 60° C. containing 10 g./l. of hydrogen peroxide and 100 g./l. of sulfuric acid is comparatively shown as follows:

| Metal ion | Rate of decomposition (g.-H$_2$O$_2$/l. min.) |
|---|---|
| Fe$^{+++}$ | >3 |
| Cu$^{++}$ | 1.7×01$^{-1}$ |
| Mn$^{++}$ | 3.8×10$^{-2}$ |
| Cr$^{+++}$ | 2.2×10$^{-2}$ |
| Ni$^{++}$ | 5.0×10$^{-3}$ |
| Zn$^{++}$ | 4.2×10$^{-3}$ |
| None | 3.3×10$^{-3}$ |

Among the ions cited, the catalytic action of copper ions in the decomposition of hydrogen peroxide is expressed by the following equation:

$$-\frac{d[H_2O_2]}{dt} = 7.8 \times 10^{22} [Cu^{++}][H_2O_2]^{3/2} \exp(-33.5 \times 10^3/1.99T)$$

where $$-\frac{d[H_2O_2]}{dt}$$

is the rate of decomposition expressed by g.-mole H$_2$O$_2$/l. min., T is the absolute temperature in K, [Cu$^{++}$] is the concentration of Cu$^{++}$ in g.-ion/l. and [H$_2$O$_2$] is the concentration of H$_2$O$_2$ in g.-mole/l.

The higher the temperature and the larger the concentration of hydrogen peroxide, the more quickly the decomposition reaction proceeds, and further metal ions accelerate the reaction in proportion to the concentration.

Consequently, if metals are treated with an aqueous sulfuric acid solution containing hydrogen peroxide, the metal ions dissolved are accumulated in the solution so that hydrogen peroxide is decomposed with vigorous evolution of oxygen gas. Thus, hydrogen peroxide is consumed wastefully and also a uniform treatment can not be performed steadily. This is a fatal defect in practice.

The present invention, counteracting the above mentioned deficiencies, provides a process for permitting the practical use of hydrogen peroxide in the chemical treatment of metals by the addition of more than 0.001 g./l. of a negatively catalyzing substance which suppresses the decomposition reaction of hydrogen peroxide.

Previously, inorganic substances such as pyrophosphates, phosphoric acid and tin dioxide colloids and organic substances such as 8-oxyquinoline were known as stabilizers for hydrogen peroxide, but they are entirely unsuitable under the conditions used for the chemical treatment of metals in the present invention or, more particularly, in the presence of a high concentration of sulfuric acid and metal ions.

The negative catalysts to be used in this invention are explained in detail as follows referring to the attached drawings.

FIG. 1 shows the relation between the concentration and the negative catalysis effect of a typical negative catalyst used in the present invention for the hydrogen peroxide decomposition reaction.

FIG. 2 shows the relation between molecular structure and the negative catalysis effect.

(1) ALIPHATIC AMINES, IMINES AND THEIR SALTS

In addition to monovalent alkylamines, which include primary amines and quarternary ammonium salts, polyvalent amines such as hexamethylenediamine are effective as negative catalysts.

Aromatic amines such as aniline are not effective, but alicyclic imines such as cyclohexylimine are effective.

The negative catalysis effect of various amines added to an aqueous solution containing 100 g./l. of sulfuric acid, 30 g.-Cu/l. of copper sulfate and 10 g./l. of hydrogen peroxide are shown in the table below. Parts of the table are graphically shown in FIGS. 1 and 2, where FIG. 1 shows the relation between the amount of n-propylamine and hexamethylenediamine added and the rate of decomposition and FIG. 2 shows the relation between the number of carbon atoms of the monovalent monoalkylamines and the rate of decomposition.

Alkylamines that exhibit remarkable effect as negative catalyst have an alkyl group having of two or more carbon atoms. The upper limit of the number of carbon atoms in the alkyl groups is expected to depend on the solubility, but owing to the high solubility of amines in sulfuric acid, alkyl groups having 3 to 10 carbon atoms showed almost the same effect as is seen in FIG. 2.

When alkyl groups contain the same number of carbon atoms, straight chain alkyl groups show better effect than branched chain alkyl groups. In comparison to primary, secondary and tertiary amines containing the same alkyl group or groups, the secondary amines have more negative catalyzing effects than the primary amine and the tertiary amines than the secondary amines.

The effect of the molecular weight of alkylamines is valid also with polyvalent amines. This is evident form the comparison of hexamethylenediamine and tetramethylenediamine in the table. The polymethylenediamines which can be employed in this invention, the ones having 4 to 12 carbon atoms exhibit especially excellent negative catalyzing effects. As for the proportions of the amines to be added, they exhibited excellent negative catalysis effects in the concentration of more than 0.001 g./l. and maintained almost constant effect over 5 g./l. as seen in FIG. 1.

(2) ALKOXYAMINES

Substituted products of the above amines (including ammonia, of course) and alcohols are also effective. Shown as examples in the table are substituted products of ammonia and three molecules of alcohol, the effect of which is nearly the same as that of corresponding alcohols. Of the alkoxyamines, the alkoxyamines formed by substituting at least one hydrogen atom of ammonia and aliphatic monoamines having 2 to 10 carbon atoms by an alkoxy radical consisting of 2 to 6 carbon atoms, exhibit the best negative catalyzing effects.

(3) ACID AMIDES

The dehydration condensation products of alkyl carboxylic acids and amines (including ammonia, of course) are effective. As is seen in the table, when the acid amide is composed of a lower amine, an effect larger than that of the amine is obtained. Of the acid amides which can be employed in this invention, especially the aliphatic acid amides formed by substituting at least one hydrogen atom of ammonia and at least one hydrogen atom connected with the nitrogen atom of aliphatic monoamines having 2 to 10 carbon atoms by an aliphatic acyl radical having 3 to 6 carbon atoms are preferable.

TABLE.—EFFECT OF VARIOUS NEGATIVE CATALYSTS
Conditions: 10 g./l. H$_2$O$_2$, 100 g./l. H$_2$SO$_4$, 120 g./l. CuSO$_4$

| Compound added | Concentration of added compound (g./l.) | Rate of decomposition (mg.-H$_2$O$_2$/l. min.) |
|---|---|---|
| None | | 167 |
| Amines and imines: | | |
| n-C$_3$H$_7$NH$_2$ | 1×10$^{-3}$ | 160 |
| n-C$_3$H$_7$NH$_2$ | 1×10$^{-2}$ | 83 |
| n-C$_3$H$_7$NH$_2$ | 1×10$^{-1}$ | 16 |
| n-C$_3$H$_7$NH$_2$ | 1 | 4.8 |
| n-C$_3$H$_7$NH$_2$ | 20 | 1.5 |
| CH$_3$NH$_2$ | 20 | 53 |
| C$_2$H$_5$NH$_2$ | 20 | 5.0 |

TABLE—Continued

| Compound added | Concentration of added compound (g./l.) | Rate of decomposition (mg.-$H_2O_2$/l. min.) |
|---|---|---|
| n-$C_4H_9NH_2$ | 20 | 1.4 |
| n-$C_5H_{11}NH_2$ | 20 | 1.4 |
| n-$C_6H_{13}NH_2$ | 20 | 1.4 |
| n-$C_8H_{17}NH_2$ | 20 | 1.4 |
| Sec.-$C_4H_9NH_2$ | 20 | 1.8 |
| Tert-$C_4H_9NH_2$ | 20 | 2.7 |
| $(C_2H_5)_2HN$ | 20 | 4.8 |
| $(C_2H_5)_3N$ | 20 | 3.7 |
| $(n-C_3H_7)_3N$ | 20 | 1.4 |
| $H_2N(CH_2)_6\cdot NH_2$ | $5\times10^{-2}$ | 33 |
| $H_2N(CH_2)_6\cdot NH_2$ | $1\times10^{-1}$ | 22 |
| $H_2N(CH_2)_6\cdot NH_2$ | $5\times10^{-1}$ | 9.6 |
| $H_2N(CH_2)_6\cdot NH_2$ | 1 | 8.8 |
| $H_2N(CH_2)_6\cdot NH_2$ | 10 | 2.4 |
| $H_2N-(CH_2)_4NH_2$ | 10 | 9.3 |
| Cyclohexyl imine | 10 | 1.6 |
| Cyclopentyl imine | 10 | 1.7 |
| Alkoxyamines: | | |
| $N(OC_2H_5)_3$ | 10 | 7.9 |
| Tri-n-propanoamine | 10 | 2.4 |
| $N(CH_3)(O-n-C_4H_9)_2$ | 5 | 3.6 |
| Acid amides: | | |
| $C_2H_5CO\cdot NH_2$ | 10 | 3.3 |
| n-$C_3H_7CO\cdot NH_2$ | 10 | 4.2 |
| n-$C_3H_7CO\cdot NH$<br>        |<br>       $CH_3$ | 10 | 4.0 |
| $CH_3\cdot CO\cdot NH_2$ | 10 | 5.1 |
| $C_2H_5\cdot CO\cdot NH_2$ | 0.001 | 168 |
| $C_2H_5\cdot CO\cdot NH_2$ | 0.01 | 49 |
| $C_2H_5\cdot CO\cdot NH_2$ | 0.05 | 27 |
| $C_2H_5\cdot CO\cdot NH_2$ | 0.1 | 14 |
| $C_2H_5\cdot CO\cdot NH_2$ | 0.5 | 5.5 |
| $C_2H_5\cdot CO\cdot NH_2$ | 1 | 4.2 |
| $C_2H_5\cdot CO\cdot NH_2$ | 5 | 2.8 |
| $C_2H_5\cdot CO\cdot NH_2$ | 10 | 2.5 |
| $C_2H_5\cdot CO\cdot NH_2$ | 50 | 2.6 |
| $C_3H_7CO\cdot NH_2$ | 10 | 2.0 |
| $C_4H_9CO\cdot NH_2$ | 10 | 1.9 |
| $C_3H_7\cdot CO\cdot NH\cdot C_2H_5$ | 9 | 1.6 |
| $H_2N\cdot CO\cdot (CH_2)_4CO\cdot NH_2$ | 9 | 1.7 |

In the examples cited above, copper ions were always present in the system, but similar results were obtained with solutions of other metal ions. For example, when 1 g.-Fe/l. of ferric sulfate was added to the above solution, the rate of decomposition of hydrogen peroxide was increased up to 4700 mg./l.-min. or 30 times as fast. However, when n-$C_4H_9NH_2$ was added in an amount of 20 g./l. to the solution, the rate of decomposition was 11 mg./l.-min., which was 8 times larger than when ferric ion was absent.

As has been described above, solutions for chemical treatment of the present invention consist of 10 to 500 g./l. of sulfuric acid, more than 0.1 g./l. of hydrogen peroxide and more than 0.001 g./l. of a negative catalyst, but a remarkable feature is that the concentration of hydrogen peroxide can be varied to an adequate value to meet the purpose of various chemical treatments such as pickling, etching, chemical milling and polishing.

The concentration range depends on the species and the state of the metal in question, and for the purpose of pickling a relatively low concentration, 0.1 to 50 g./l., is sufficient in most cases. In the case of using more than 50 g./l., the oxides cannot always be dissolved dependent upon the redox potential of the system.

For etching and chemical milling, the adequate concentration of hydrogen peroxide is 5 to 150 g./l. Besides this factor of concentration, the use of elevated temperatures is an effective factor in increasing the rate of dissolution.

For example, in the case of etching of copper foils used for printed circuits, a mixed solution of 20 to 120 g./l. of hydrogen peroxide and 30 to 250 g./l. of sulfuric acid is employed in conjunction with the negative catalyst in the present invention. This solution has industrial advantages in that the treatment is effected in a short time with, no water pollution and excellent recovery of copper, as compared with the use of ammonium persulfate or ferric chloride in place of the negative catalysts used herein.

Mixed solutions of hydrogen peroxide and sulfuric acid or such solutions with the addition of phenacetin, sulfathiazole or a small amount of silver nitrate are already known. But these known additives are precious and tend to cause decomposition of the hydrogen peroxide whereas the treatment solution according to the present invention is composed of additives (negative catalyst) which are available as industrial chemicals at low costs, and these additives stabilize hydrogen peroxide: thus the treatment according to the present invention is economical and very easy to conduct with little danger of "undercut," and as a result precise etching is possible.

For chemical polishing, a high concentration, 10 to 300 g./l., of hydrogen peroxide solution is utilized.

The diffusion resistance layer of ions which plays an important role in performing lustrous polishing can be formed in a steady state according to the present invention because the evolution of oxygen gas, due to the decomposition of hydrogen peroxide, is suppresed by the presence of the negative catalyst.

When a high concentration of hydrogen peroxide solution is used, thin films of metal oxide may be formed on the surface of the metal owing to the high redox potential. In such a case, it is necessary to bring the metal piece into contact with a liquid which dissolves the oxide film, such as a dilute sulfuric acid solution.

As described above, by changing (controlling) the concentration of hydrogen peroxide, it is possible to adjust the oxidizing power of the solution so that various kinds of chemical treatments can be effected. Further, the practical importance of the present invention is that the added negative catalysts not only prevent the decomposition of hydrogen peroxide, but also enhance the chemical dissolution.

That is to say, the addition of negative catalysts according to the present invention increases the rate of dissolution of metal materials, as much as five times in some cases and gives a very smooth surface; thus contributing largely to the speed-up of the above-mentioned chemical treatments.

Although some of the negative catalysts lowers the dissolution rate down to less than 50% and in some cases even to less than 10% of that obtained when such negative catalysts are not added, they are useful as inhibitors for preventing dissolution of the metal phase in the pickling treatment. For example, in the pickling of oxide scale of copper, according to the present invention, cuprous oxide which is non-soluble in sulfuric acid can be completely dissolved and removed. But at the same time the exposed metallic copper is also dissolved, thus causing metal loss. This metal loss can be avoided by use of the inhibitive negative catalyst. For the inhibitive negative catalyst, acid amides, more than 5 cc./l. of octylamine and amines having a residual aliphatic radical of 1 to 2 carbon atoms, and also ethylendiamine may be used.

Effects on dissolution rate of representative negative catalysts of the present invention in the case of pure copper are shown below. Dissolution rates were determined by immersing pure copper plates without stirring in a liquid which was prepared by a adding negative catalyst to a mixed solution of 25 g./l. of hydrogen peroxide and 200 g./l. of sulphuric acid at 20° C., and calculating the changes in the weight of the copper plates before and after the immersion.

RELATIVE DISSOLUTION RATES*

| No addition | | 100 |
|---|---|---|
| $C_2H_5NH_2$ | 10 cc./l. | 28 |
| n-$C_4H_9NH_2$ | 10 cc./l. | 232 |
| n-$C_8H_{17}NH_2$ | 1 cc./l. | 314 |
| n-$C_8H_{17}NH_2$ | 5 cc./l. | 95 |
| n-$C_8H_{17}NH_2$ | 10 cc./l. | 8 |
| $H_2N-(CH_2)_4-NH_2$ | 10 g./l. | 202 |
| $C_2H_5CO\cdot NH_2$ | 0.5 | 98 |
| $C_2H_5CO\cdot NH_2$ | 1 | 53 |
| $C_2H_5CO\cdot NH_2$ | 10 g./l. | 22 |

*Against the basic figure of 100 for the dissolution rate in case of "no addition" being 100.

Comparing the above results and the results set forth in the previous table showing effects of the present negative catalysts, it is understood that at least 5 cc./l. of octylamine and at least 1 g./l. of propionyl amide are particularly useful for special picklings where both negative catalyst effects and dissolution inhibitor effects are required. From the economical viewpoint, the upper limits of the concentration of these additives are 100 cc./l. and 50 g./l. respectively.

Finally, the treatment of used treatment solutions and water and also recovery of metal will be mentioned.

In the treatment according to the present invention, the metal component is dissolved in the form of sulfate, and therefore both sulfuric acid and hydrogen peroxide are consumed. If the same solution is used for a long period while sulfuric acid and hydrogen peroxide are replenished, the concentration of the sulfate becomes close to saturation and, as a result, remarkable a decrease of in the rate of treatment is inevitable.

A method generally used for the removal of harmful substances in the used treatment solution and washing water and for recovery of the metal component is the neutralization procedure using alkali or calcium hydroxide, but separation of the sulfate by concentration and cooling is also possible.

The ordinary method of electrolysis can be applied using an insoluble anode if the system includes a metal, such as copper, of which the ionization tendency is smaller than that of hydrogen.

As is evident from the cathodic potential that is mentioned below, copper is not deposited if the concentration of hydrogen peroxide exceeds 10 g./l., but copper can be recovered with a current efficiency of larger than 50%, when the concentration of hydrogen peroxide is below 5 g./l. and especially with an efficiency of larger than 90%, when the hydrogen peroxide concentration is 2 g./l.

$$Cu^{++} + 2e \rightarrow Cu$$

$E° = 0.337$ v., $dE°/dT = 0.003$ mv./deg.

$$H_2O_2 + 2H^+ + 2e \rightarrow 2H_2O$$

$E° = 1.77$ v., $dE°/dT = -0.657$ mv./deg.

Since sulfuric acid is regenerated on the anode under conditions in which copper is deposited, the solution can be reused for chemical treatment.

The used washing water can also be rendered harmless simply by a neutralization treatment. In the event that the negative catalyst raises the B.O.D. (Biochemical Oxygen Demand) value of river water, a negative catalyst of a smaller B.O.D. value may be selected.

An example of measurement of the B.O.D. values based upon the Japanese Industrial Standards (JIS KO 102) is shown below.

| Negative catalyst: | B.O.D. (g./g.) |
|---|---|
| $n\text{-}C_3H_7NH_2$ | 0.06–0.18 |
| $(n\text{-}C_3H_7)_3N$ | 0.02–0.09 |
| $n\text{-}C_4H_9NH_2$ | 1.05–1.24 |
| $n\text{-}C_6H_{13}NH_2$ | 1.24–1.57 |
| $H_2N\text{—}(CH_2)_6\text{—}NH_2$ | 0.01–0.03 |

In an ordinary case there will be almost no fear of the washing water, contaminated by the negative catalyst, raising the B.O.D. value of river water. From the above data, however, the results will be safer especially if $n\text{-}C_3H_7NH_2$, $(n\text{-}C_3H_7)_3N$ or $H_2N\text{—}(CH_2)_6\text{—}NH_2$ is selected as the catalyst.

The present invention will be illustrated by referring to the following examples.

Example 1

A coil, 800 to 1000 mm. in diameter and 100 kg. in weight of wire (8 mm. in diameter) of pure copper produced by a hot rolling process and having 0.3% by weight of black oxide scale was immersed in a solution consisting of 95 g./l. of sulfuric acid and 35 g.-Cu/l. of copper sulfate at 60° C., and in 10 minutes the black scale disappeared both outside and inside of the coil. About 0.05% by weight of a fine powder of copper appeared over the surface of the wire which copper powder was formed from cuprous oxide in the scale. After the pickling treatment, the copper coil was washed with water in a jet stream to remove the powder.

When hydrogen peroxide was added to this solution in the amount of 2 g./l., oxygen gas was observed to evolve due to vigorous decomposition of the hydrogen peroxide. When $n\text{-}C_3H_7NH_2$ was added beforehand in the amount of 5 g./l., evolution of bubbles was not observed at all, and 1.9 g./l. of hydrogen peroxide remained even after 60 minutes. When the above-described wire of pure copper was immersed in the above solution for the pickling treatment, the oxide scale was completely removed in 5 minutes, and a semi-lustrous clean surface was obtained without the formation of copper powder. Since in the present process cuprous oxide is completely dissolved and a powder of copper is not formed, some of the steps and equipment required in the conventional pickling process, such as the use of a water jet and the collection of copper powders by precipitation, can be eliminated.

For pickling continuously with the solution of this example, a fraction of the solution was continuously led into electrolysis cells and thereafter dissolved copper was recovered and at the same time sulfuric acid was regenerated.

In the electrolysis cells, lead anodes and copper cathodes, both in the form of thin plates of the same dimensions were placed alternatingly at intervals of 75 mm. Copper was deposited on the cathodes with a current efficiency of 98% when the direct current density was 3 a./dm.² The solution was regenerated as shown below.

| | Inlet | Outlet |
|---|---|---|
| $Cu^{++}$ (g./l.) | 39 | 30 |
| $H_2SO_4$ (g./l.) | 86 | 100 |
| $H_2O_2$ (g./l.) | 0.9 | 0.2 |

The solution at the outlet was replenished with hydrogen peroxide to the concentration 2 g.-$H_2O_2$/l. and then introduced into the vessel for pickling.

The replenishment of the amine was conducted intermittently to such an extent as to compensate the loss that occurred when the wires were taken out of the solution.

Example 2

In the conventional chemical polishing process, when a copper plate is immersed for 5 seconds in a solution consisting of 50 g./l. of hydrogen peroxide and 200 g./l. of sulfuric acid at room temperature, the surface layer of the copper plate is dissolved to produce a lustrous smooth surface. When copper ion dissolved is accumulated in the solution, hydrogen peroxide is consumed by vigorous decomposition and, in addition, oxygen bubbles agitate the solution and after adhere to the metal; accordingly chemical polishing to produce a uniform and brilliant surface an not be effected. Therefore, the solution should be discarded before the concentration of copper increases.

On the contrary, when tri-n-propanolamine was added to the above solution in the concentration of 10 g./l., the evolution of oxygen gas was so little as not to be seen by the naked eye and therefore the stable solution permitted excellent chemical polishing because no oxygen bubbles are formed therein.

The rate of decomposition of hydrogen peroxide in a solution consisting of 50 g./l. of hydrogen peroxide, 100 g./l. of sulfuric acid and 50 g./l. of copper ion was 3.3 mg./l.-min. when 10 g./l. of tri-n-propanolamine was present and 420 mmg./l.-min. when it is was not present, at room temperature (30° C.).

Example 3

A coil 100 kg. in weight and 800 to 1000 mm. in diameter, of hot-worked pure copper wire of 8 mm. diameter having 0.3% by weight of black oxide scale, was immersed in a solution of 150 g./l. of $H_2SO_4$ and 140 g./l. of $CuSO_4$ at 60° C. In ten minutes the black scale was removed, but about 0.05% of fine copper powder remained on the whole surface of the wire. This powder was washed off by a water shower and the wire was dried to complete the pickling work. For separation and recovery of the copper powder from the showered water, precipitation equipment of large capacity and additional man-power were required.

Addition to the above solution of hydrogen peroxide in an amount of 4 g. per litre caused generation of oxygen gas bubbles. Whereas in the chemical treatment solution according to the present invention in which 10 cc./l. of octylamine has been previously added, no generation of bubbles were observed, and the concentration of hydrogen peroxide remained more than 3.9 g./l. after 60 minutes. The above coil was immersed in the inventive solution and black scale on the whole of the coil was completely removed in 5 minutes with no copper powder remaining and the whole surface of the wire was exposed. The weight loss was less than 0.32%, as compared with more than 0.4% when 10 cc./l. of hexylamine, for example, was added.

Example 4

Hot worked copper-nickel alloy wire (Cu: 90%, Ni 10%) has 0.2% by weight of oxide scale. When this wire is treated with a dilute sulfuric acid solution, only reddish incomplete finish results and the white silvery finish characteristic of the pure alloy cannot be attained. Therefore, in the conventional method, a mixed solution of sulfuric acid and sodium dichromate has been mostly used. However, this causes a problem in that poisonous and high-cost chromium ion is used.

A wire coil (100 kg. and 800 to 100 mm. diameter) having oxide scale was immersed in a solution containing 200 g./l. of $H_2SO_4$, 20 g./l. of $H_2O_2$ and 20 g./l. of propionyl amide at 40° C. After 15 minutes, the whole of the coil had a silvery white finish. The weight loss was 0.26% by weight, as compared with 0.35% by weight when 20 cc./l. of butyl amine was added instead of propionyl amide.

Example 5

A specimen was prepared from printed circuits which were obtained by laminating electrolytic copper foils of 35μ thickness on a Bakelite board to the size of 50 x 100 x 2 mm. and printing on the copper surface thereof wires of 5 mm. width with insulating points. This specimen was subjected to etching in the undermentioned testing liquid, giving it a reciprocating movement of 10 mm. amplitude at a rate of 60 times per minute to measure the time required for exposing the Bakelite surface. Also measurements were made on the dissolution depth in the horizontal direction at the insulation border portion after the completion of etching to determine the undercut ratio calculated as follows:

$$\frac{\text{Thickness of copper foil}}{\text{Dissolution depth in a horizontal direction}}$$

The water for preparation of the solution was deionized water.

| Number | Solution | Temperature, °C. | Time, min. | Undercut ratio |
|---|---|---|---|---|
| Conventional: | | | | |
| 1 | $H_2O_2$, 50 g./l.<br>$H_2SO_4$, 100 g./l. | 40 | 3.3 | 2.3 |
| Present invention: | | | | |
| 2 | $H_2O_2$, 50 g./l.<br>$H_2SO_4$, 100 g./l.<br>n-$C_4H_9NH_2$, 20 g./l. | 40 | 1.3 | 2.8 |
| 3 | $H_2O_2$, 50 g./l.<br>$H_2SO_4$, 100 g./l.<br>$H_2N-(CH_2)_6-NH_2$, 30 g./l. | 40 | 1.5 | 2.8 |

From the above table it is understood that the resolution speed and undercut ratio are higher with solutions Nos. 2 and 3 of the present invention than with solution No. 1.

What is claimed is:

1. A solution for the chemical dissolution treatment of metallic materials consisting essentially of a mixed aqueous solution of 10–500 g./l. of sulfuric acid, 0.1 g./l. to 300 g./l. of hydrogen peroxide, and from 0.001 g./l. to 30 g./l. of at least one alkyl amine to prevent the decomposition of the hydrogen peroxide selected from the group consisting of alkyl monoamines having 2 to 10 carbon atoms, their salts, polymethylenediamines having 4 to 12 carbon atoms and their salts.

2. A solution for the chemical dissolution treatment of metallic materials consisting essentially of a mixed aqueous solution of 10–500 g./l. of sulfuric acid, 0.1 g./l. to 300 g./l. of hydrogen peroxide, and from 0.001 g./l. to 30 g./l. of at least one alkoxy amine to prevent the decomposition of the hydrogen peroxide selected from the group consisting of alkoxyamines formed by substituting at least one hydrogen atom of ammonia by an alkoxy radical having 2 to 6 carbon atoms and alkoxyamines formed by substituting at least one hydrogen atom connected with the nitrogen atom of an alkyl monoamine having 2 to 10 carbon atoms by an alkoxy radical having 2 to 6 carbon atoms.

3. A solution for the chemical dissolution treatment of metallic materials consisting essentially of a mixed aqueous solution of 10–500 g./l. of sulfuric acid, 0.1 g./l. to 300 g./l. of hydrogen peroxide, and from 0.001 g./l. to 30 g./l. of at least one alkyl acid amide to prevent the decomposition of the hydrogen peroxide selected from the group consisting of alkyl acid amides formed by substituting at least one hydrogen atom of ammonia by an alkyl acyl radical having 3 to 6 carbon atoms, and at least one alkyl acid amide formed by substituting at least one hydrogen atom connected with the nitrogen atom of an alkyl monoamine having 2 to 10 carbon atoms by an alkyl acyl radical having 3 to 6 carbon atoms.

4. A solution for the chemical dissolution treatment of metallic materials consisting essentially of a mixed aqueous solution of 10–500 g./l. of sulfuric acid, 0.1 g./l. to 300 g./l. of hydrogen peroxide, and from 0.001 g./l. to 30 g./l. of at least one alicyclic imine to prevent the decomposition of the hydrogen peroxide selected from the group consisting of monoimines having a 5 to 8 membered ring.

5. A solution used for the pickling of metallic materials according to claim 1, in which the concentration of the hydrogen peroxide is 0.1 to 50 g./l.

6. A solution used for the etching or chemical milling of metallic materials according to claim 1, in which the concentration of the hydrogen peroxide is 5 to 150 g./l.

7. A solution for the chemical dissolution treatment of metallic materials consisting essentially of a mixed aqueous solution of 10 to 500 g./l. of sulfuric acid, 0.1 g./l. to 300 g./l. of hydrogen peroxide, and at least one amine to prevent the decomposition of the hydrogen peroxide selected from the group consisting of mono-n-propylamine, di-n-propylamine, tri-n-propylamine and hexamethylenediamine in an amount of from 0.001 g./l. to 30 g./l.

8. A solution for pickling copper and copper alloys consisting essentially of a mixed aqueous solution of 10 to 500 g./l. of sulfuric acid, 0.1 to 50 g./l. of hydrogen peroxide, and to prevent the decomposition of the hydrogen peroxide, at least one compound selected from the group consisting of 5-100 cc./l. of octylamine and 1-50 g./l. of propionylamide.

References Cited

UNITED STATES PATENTS

| | | | |
|---|---|---|---|
| 2,154,451 | 4/1939 | Hull | 148—8 |
| 3,293,093 | 12/1966 | Jones et al. | 156—18 |
| 3,407,141 | 10/1968 | Banush et al. | 252—79.4 |
| 3,463,733 | 8/1969 | Achenbach | 252—79.4 |
| 3,412,032 | 11/1968 | Jenks | 252—79.4 |
| 3,556,883 | 1/1971 | Naito et al. | 156—20 |
| 3,413,205 | 11/1968 | Hardman | 252—79.4 |
| 3,434,890 | 3/1969 | Aronberg | 148—6.14 |

JACOB STEINBERG, Primary Examiner

U.S. Cl. X.R.

156—3; 252—102